US010288791B2

(12) United States Patent
Tseng et al.

(10) Patent No.: US 10,288,791 B2
(45) Date of Patent: May 14, 2019

(54) EXPANSION CARD WITH HOMOGENIZED LIGHT OUTPUT AND LIGHT-HOMOGENIZING DEVICE THEREOF

(71) Applicant: APACER TECHNOLOGY INC., New Taipei (TW)

(72) Inventors: Hua-Min Tseng, New Taipei (TW); Ming-Han Chung, New Taipei (TW); Wen-Chin Wu, New Taipei (TW); Chien-Pang Chen, New Taipei (TW)

(73) Assignee: APACER TECHNOLOGY INC., New Taipei (TW)

(*) Notice: Subject to any disclaimer, the term of this patent is extended or adjusted under 35 U.S.C. 154(b) by 129 days.

(21) Appl. No.: 15/238,084

(22) Filed: Aug. 16, 2016

(65) Prior Publication Data
US 2018/0024285 A1  Jan. 25, 2018

(30) Foreign Application Priority Data
Jul. 22, 2016 (TW) .............................. 105123140 A

(51) Int. Cl.
*F21V 33/00* (2006.01)
*F21V 8/00* (2006.01)
(Continued)

(52) U.S. Cl.
CPC ........ *G02B 6/0025* (2013.01); *F21V 33/0052* (2013.01); *G02B 6/0035* (2013.01);
(Continued)

(58) Field of Classification Search
CPC .... G02B 6/0033; G02B 6/0035; G02B 6/004; G02B 6/0041; G02B 6/0025;
(Continued)

(56) References Cited

U.S. PATENT DOCUMENTS 5,497,293 A *  3/1996  Noguchi ............... F21V 17/104
                                                       362/23.15
8,047,669 B2 * 11/2011  Bourdelais ........... G02B 6/0091
                                                       362/249.02
(Continued)

FOREIGN PATENT DOCUMENTS

CN      102011978       4/2011
CN      104508364       4/2015
(Continued)

*Primary Examiner* — Anh T Mai
*Assistant Examiner* — Arman B Fallahkhair
(74) *Attorney, Agent, or Firm* — Kirton McConkie; Evan R. Witt

(57) ABSTRACT

An expansion card with homogenized light outputs and light-homogenizing device thereof are disclosed. The expansion card includes a circuit board and a light-homogenizing device. The circuit board includes a light-emitting device disposed on a first side edge. The light-homogenizing device includes a light-guiding body, a light-diffusion element, and a light-turning element. The light-guiding body includes a light-input side and a light-output side opposite to each other, and the light-input side is adjacent to the first side edge. The light-diffusion element is disposed on the light-input side of the light-guiding body and opposite to the light-emitting device. The light-diffusion element and the light-out side are configured to diffuse the light beams entering into the light-guiding body from the light-emitting device and form a light-transmitting path. The light-turning element is disposed in the light-guiding body, located on the light-transmitting path and configured to turn the directions of portion of the light beams.

20 Claims, 6 Drawing Sheets

(51) Int. Cl.
*F21Y 115/10* (2016.01)
*F21W 111/10* (2006.01)

(52) U.S. Cl.
CPC ......... *G02B 6/0068* (2013.01); *G02B 6/0073* (2013.01); *G02B 6/0083* (2013.01); *G02B 6/0091* (2013.01); *F21W 2111/10* (2013.01); *F21Y 2115/10* (2016.08)

(58) Field of Classification Search
CPC .. G02B 6/0052; G02B 6/0068; G02B 6/0073; G02B 6/0083; G02B 6/0091; F21K 9/61
See application file for complete search history.

(56) References Cited

U.S. PATENT DOCUMENTS

| | | | | |
|---|---|---|---|---|
| 8,118,464 | B2* | 2/2012 | Chang | G02B 6/0036 362/608 |
| 9,091,411 | B2* | 7/2015 | Huang | F21V 7/04 |
| 9,720,457 | B1* | 8/2017 | Cheng | G06F 1/181 |
| 9,723,697 | B1* | 8/2017 | Cheng | H05B 37/0272 |
| 9,746,172 | B1* | 8/2017 | Cheng | F21V 33/00 |
| 9,786,136 | B2* | 10/2017 | Cheng | G08B 5/36 |
| 9,801,280 | B2* | 10/2017 | Cheng | H05K 1/18 |
| 9,817,168 | B2* | 11/2017 | Kuo | G02B 6/0001 |
| 9,820,366 | B2* | 11/2017 | Kuo | H05B 41/2828 |
| 9,839,121 | B2* | 12/2017 | Cheng | H05K 1/0274 |
| 9,845,935 | B1* | 12/2017 | Cheng | F21V 7/0008 |
| 2017/0343198 | A1* | 11/2017 | Ning | F21V 23/0442 |

FOREIGN PATENT DOCUMENTS

| | | |
|---|---|---|
| TW | 200520599 | 6/2005 |
| TW | 201430556 | 8/2014 |

\* cited by examiner

EXPANSION CARD WITH HOMOGENIZED LIGHT OUTPUT AND LIGHT-HOMOGENIZING DEVICE THEREOF

FIELD OF THE INVENTION

The present invention relates to an expansion card, and more particularly to an expansion card with a homogenized light output and a light-homogenizing device thereof.

BACKGROUND OF THE INVENTION

With the increasing development of science and technology, computers have become an indispensable part of people's lives. In order to expand the capabilities and links of computer, all kinds of expansion cards, such as memory devices or interface cards, are usually inserted and set on the main circuit board of the computer. After the expansion cards are inserted in the configuration of the main circuit board of the computer, the computer is rebooted for performing a testing. When there is a fault or incompatibility problem, the computer must be shut down to re-install or replace the expansion cards, and repeatedly execute the aforementioned processes for testing. However, with the repeated processes to start up and shut down the computer for testing and installing the expansion cards, the entire system won't be expanded conveniently, and the repeated processes might further lead the electronic devices thereof to be broken. Thus, an expansion card combined with a light-emitting device is provided in the market. The light-emitting device is used for indicating the compatibility of the expansion card inserted and set on the main circuit board of the computer, identifying the using status of the expansion card or determining if the expansion card is out of order according to the status of emitting the light. Certainly, the light-emitting device can be used as a decorative lighting for providing a kind of visual enjoyment merely. But such light-emitting device usually emits uneven light beams and causes the partial brightness problem.

On the other hand, for solving the heat dissipation problem, heat-dissipating devices can be configured and disposed on the expansion card directly. However, the light beams emitted from the aforementioned light-emitting device are usually influenced by the disposition of such heat-dissipating devices. Consequently, the uneven brightness is caused and the entire illumination efficiency is influenced.

SUMMARY OF THE INVENTION

The present invention provides an expansion card with a homogenized light output and a light-homogenizing device thereof. The expansion card can be a memory device or an interface card and configured to overcome the problems of uneven illumination and low illumination efficiency caused by the prior art.

The present invention further provides an expansion card with a homogenized light output and a light-homogenizing device thereof. The light-homogenizing device is compact, detachable and can be disposed on a circuit board of an expansion card firmly to homogenize the light beams from the light-emitting device on the circuit board and improve the illumination efficiency. In addition, the light-homogenizing device can protect the electronic device and the light-emitting device disposed on the circuit board, and further assist in dissipating heats from the electronic device and the light-emitting device.

In accordance with an aspect of the present invention, there is provided an expansion card with a homogenized light output. The expansion card includes a circuit board and a light-homogenizing device. The circuit board includes at least one light-emitting device disposed on a first side edge thereof. The light-homogenizing device includes a light-guiding body, at least one light-diffusion element and at least one light-turning element. The light-guiding body includes a light-input side and at least one light-output side. The light-input side and the light-output side are disposed on two opposite sides of the light-guiding body respectively, and the light-input side is adjacent to the first side edge of the circuit board. The at least one light-diffusion element is disposed on the light-input side of the light-guiding body and opposite to the light-emitting device of the circuit board. The light-diffusion element and the light-output side are configured to form at least a light-transmitting path, and the light-diffusion element is configured to diffuse plural light beams entering into the light-guiding body from the light-emitting device. The at least one light-turning element is disposed in the light-guiding body, located on the light-transmitting path and configured to turn the directions of portion of the light beams.

In accordance with another aspect of the present invention, there is provided a light-homogenizing device applied in a circuit board of an expansion card. The circuit board includes at least one light-emitting device disposed on a first side edge thereof. The light-guiding body includes a light-input side and at least one light-output side. The light-input side and the light-output side are disposed on two opposite sides of the light-guiding body respectively, and the light-input side is adjacent to the first side edge of the circuit board. The at least one light-diffusion element is disposed on the light-input side of the light-guiding body and opposite to the light-emitting device of the circuit board. The light-diffusion element and the light-output side are configured to form at least a light-transmitting path, and the light-diffusion element is configured to diffuse plural light beams entering into the light-guiding body from the light-emitting device. The at least one light-turning element is disposed in the light-guiding body, located on the light-transmitting path and configured to turn the directions of portion of the light beams.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
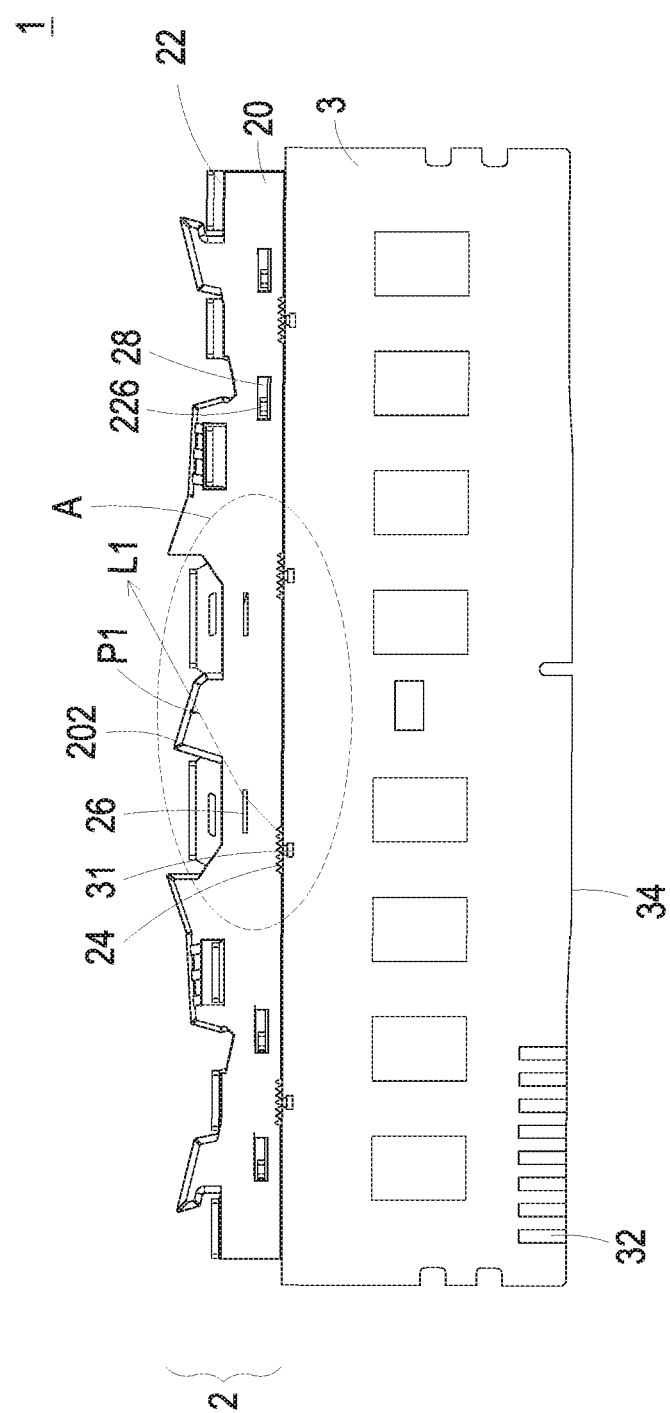
FIG. 1 is a front view illustrating an expansion card with a homogenized light output according to an embodiment of the present invention.
Figure 2:
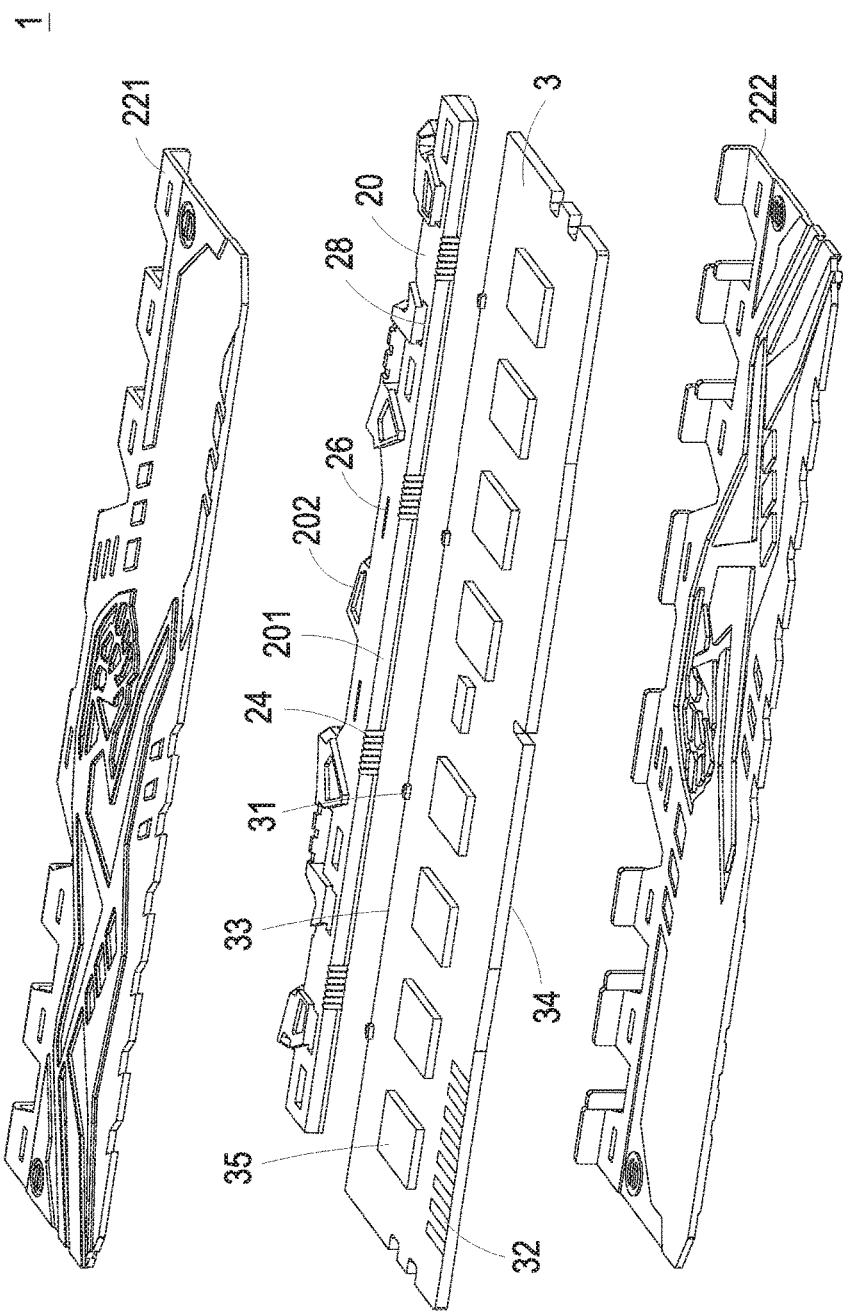
FIG. 2 is an exploded view illustrating an expansion card with a homogenized light output according to an embodiment of the present invention.
Figure 3:
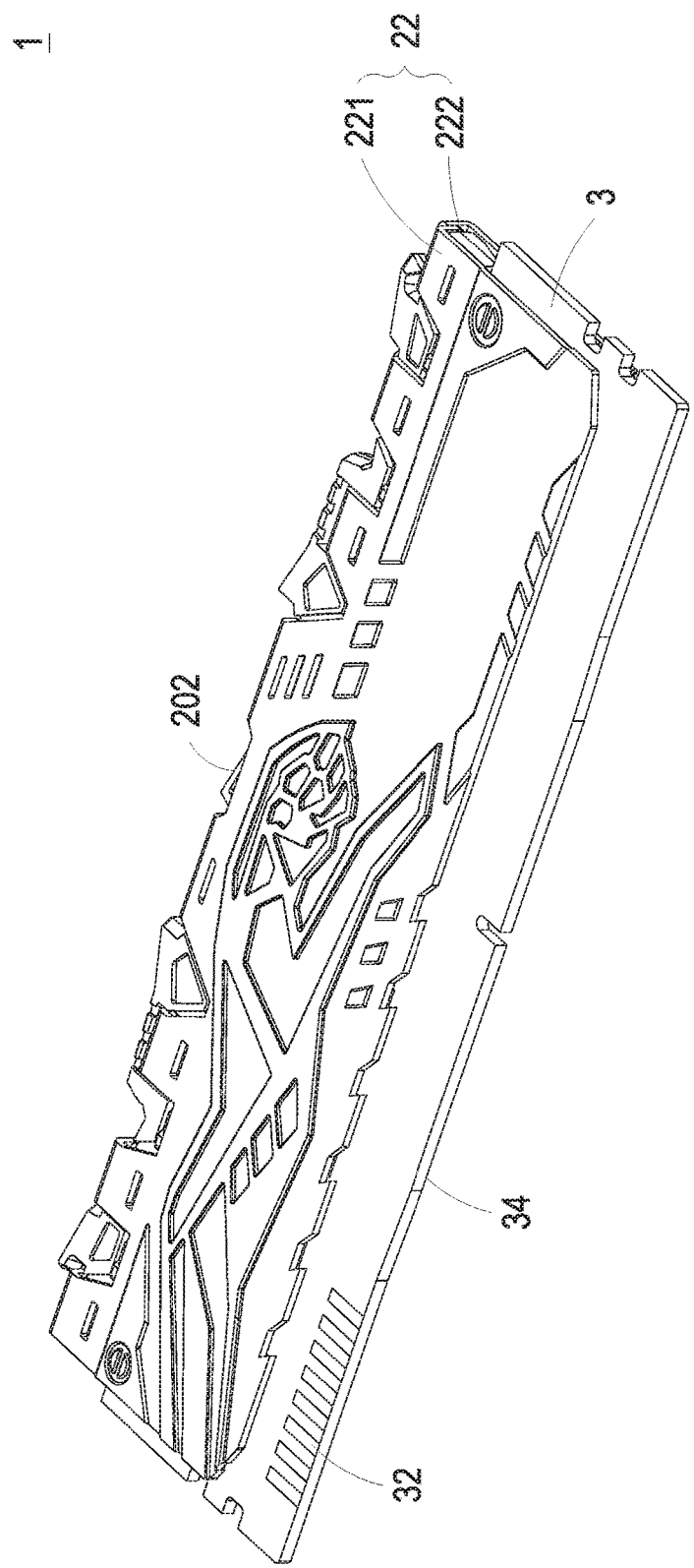
FIG. 3 is a perspective view illustrating an expansion card with a homogenized light output according to an embodiment of the present invention.

FIG. 1 is a front view illustrating an expansion card with a homogenized light output according to an embodiment of the present invention. FIG. 2 is an exploded view illustrating an expansion card with a homogenized light output according to an embodiment of the present invention. FIG. 3 is a perspective view illustrating an expansion card with a homogenized light output according to an embodiment of the present invention. As shown in FIGS. 1 to 3, the expansion card with a homogenized light output 1 (hereinafter referred to as "the expansion card") can be but not limited to a memory device or an interface card. Preferably, the expansion card 1 is a memory device, and more preferably a double data rate synchronous dynamic random access memory (DDR SDRAM). The expansion card 1 includes a light-homogenizing device 2 and a circuit board 3. The circuit board 3 includes at least one light-emitting device 31, and the at least one light-emitting device 31 is disposed on a first side edge 33 of the circuit board 3 and configured to provide the light beam L1. The light-homogenizing device 2 includes a light-guiding body 20, a clamping set 22, at least one light-diffusion element 24 and at least one light-turning element 26. The light-guiding body 20 includes a light-input side 201 and at least one light-output side 202. The light-input side 201 and the light-output side 202 are disposed on two opposite sides of the light-guiding body 20 respectively. The light-input side 201 of the light-guiding body 20 is adjacent to the first side edge 33 of the circuit board 3 and opposite to the at least light-emitting device 31 of the circuit board 3. The at least one light-diffusion element 24 is disposed on the light-input side 201 of the light-guiding body 20 and opposite to the light-emitting device 31 of the circuit board 3. The light-diffusion element 24 disposed on the light-input side 201 of the light-guiding body 20 and the light-output side 202 are configured to form at least a light-transmitting path P1. Consequently, the light beam L1 emitted from the light-emitting device 31 passes through the corresponding light-diffusion element 24, enters into the light-guiding body 20 from the light-input side 201, and is transmitted along the light-transmitting path P1 to emit out from the light-output side 202. The light-diffusion element 24 is configured to diffuse plural light beams entering into the light-guiding body 20 from the light-emitting device 31. The at least one light-turning element 26 is disposed in the light-guiding body 20, located on the light-transmitting path P1 and configured to turn the directions of portion of the light beams. Consequently, the light beams of the light-emitting device 31 is transmitted to pass through the light-guiding body 20 and outputted evenly from the at least one light-output side 202.

In the embodiment, the circuit board 3 includes an input and output interface 32. The input and output interface 32 is disposed on a second side edge 34 of the circuit board 3. The first side edge 33 and the second side edge 34 are opposite to each other. The input and output interface 32 can be but not limited to gold fingers (gold-plated contact pins) disposed on PCB. In one embodiment, the light-emitting device 31 includes one or a plurality of light-emitting diodes (LEDs). In the embodiment, the light-diffusion element 24 is an uneven structure, for example a serrated cutting edge, and integrated with the light-guiding body 20 to form one piece. Alternatively, the light-diffusion element 24 can be a light-transmitting optical film attached to the light-input side 201 of the light-guiding body 20. Optionally, the light-transmitting optical film includes an uneven structure. With the disposition of the light-diffusion element 24, the light beam L1 emitted by the light-emitting device 31 passes through the light-diffusion element 24 firstly and is transmitted into the light-input side 201 of the light-guiding body 20. Consequently, the light beam L1 is scattered at random angles. In the embodiment, the light-turning element 26 is a slit aperture. Alternatively, the light-turning element 26 can be a light-transmitting optical element embedded in the light-guiding body 20 and located on the light-transmitting path P1. In one embodiment, the light-turning element 26 has a first refractive index, the light-guiding body 20 has a second refractive index, and the first refractive index is smaller than the second refractive index. Consequently, the light-turning element 26 can be configured to turn the directions or change the transmitting path of portion of the light beams by utilizing the principle of refraction and offset.

Figure 4:
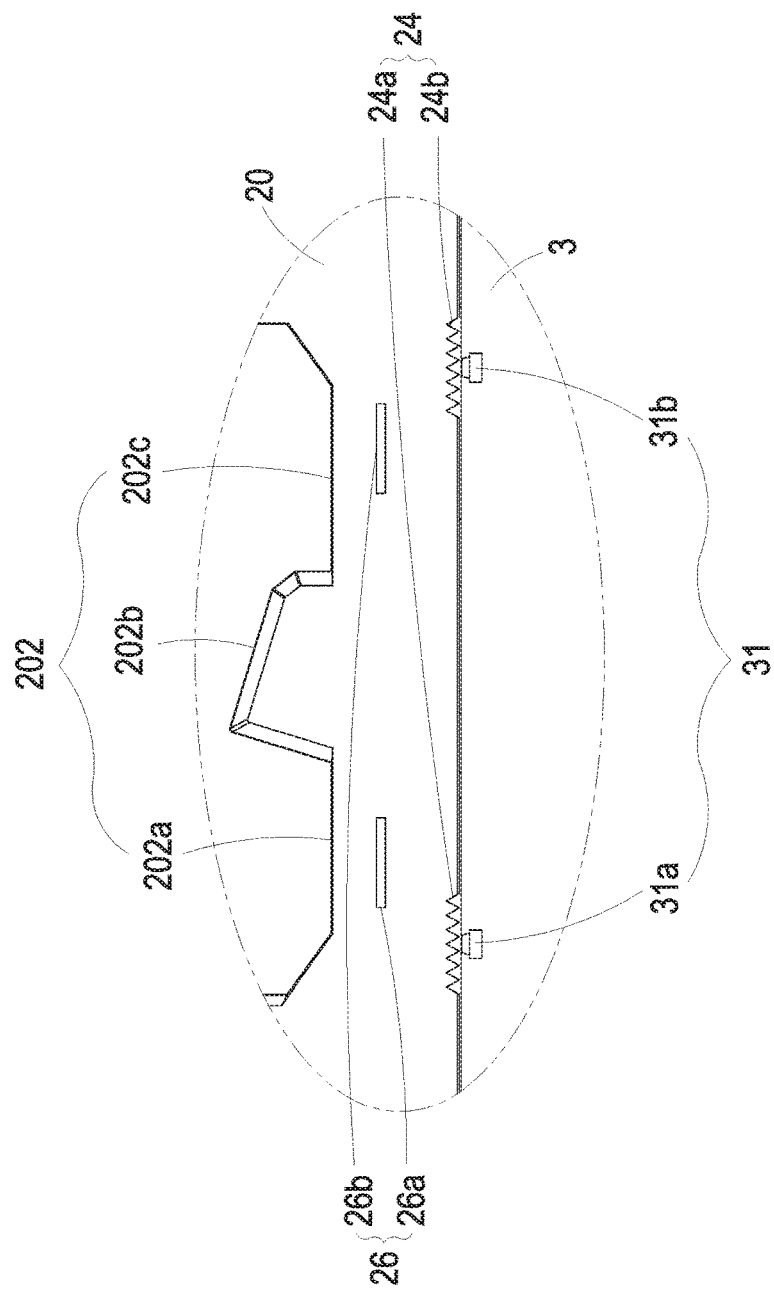
FIG. 4 is a partial enlargement view illustrating A zone of FIG. 1.

FIG. 4 is a partial enlargement view illustrating A zone of FIG. 1, where the clamping set 22 is omitted. As shown in FIG. 4, in one embodiment, at least one light-output side 202 of the light-guiding body 20 includes a first light-output side 202a, a second light-output side 202b and a third light-output side 202c. The at least one light-diffusion element 24 includes a first light-diffusion element 24a and a second light-diffusion element 24b, and the at least one light-turning element 26 includes a first light-turning element 26a and a second light-turning element 26b. Additionally, the at least one light-emitting device 31 includes a first light-emitting device 31a and a second light-emitting device 31b. The first light-diffusion element 24a and the second light-diffusion element 24b are disposed and opposite to the first light-emitting device 31a and the second light-emitting device 31b respectively. The distance between the first light-diffusion element 24a and the first light-output side 202a is shorter than the distance between the first light-diffusion element 24a and the second light-output side 202b. The first light-turning element 26a is located between the first light-diffusion element 24a and the first light-output side 202a. The distance between the first light-turning element 26a and the first light-output side 202a is shorter than the distance between the first light-turning element 26a and the second light-output side 202b. With the disposition of the first light-turning element 26a, a portion of light beams emitted by the first light-emitting device 31a is offset from the first light-output side 202a and outputted through the second light-output side 202b, so as to accomplish the light-homogenizing effect. Similarly, the distance between the second light-diffusion element 24b and the third light-output side 202c is shorter than the distance between the second light-diffusion element 24b and the second light-output side 202b. The second light-turning element 26b is located between the second light-diffusion element 24b and the third light-output side 202c, and the distance between the second light-turning element 26b and the third light-output side 202c is shorter than the distance between the second light-turning element 26b and the second light-output side 202b. With the disposition of the second light-turning element 26b, a portion of light beams emitted by the second light-emitting device 31b is offset from the third light-output side 202c and outputted through the second light-output side 202b, so as to accomplish the light-homogenizing effect. In one embodiment, the first light-turning element 26a has a vertical projection on the light-guiding body 20 opposite to the first side edge 33, and the vertical projection is located between another vertical projection of the second light-output side 202b on the light-guiding body 20 opposite to the first side edge 33 and the first light-emitting device 31a. Similarly, the second light-turning element 26b has a vertical projection on the light-guiding body 20 opposite to the first side edge 33, and the vertical projection is located between another vertical projection of the second light-output side 202b on the light-guiding body 20 opposite to the first side edge 33 and the second light-emitting device 31b. It is noted that, the numbers, the sizes, and the dispositions of the light-emitting device 31, the light-output side 202, the light-diffusion element 24 and the light-turning element 26 aren't limited to the above embodiment and can be adjusted according to the practical requirements.

Figure 5:
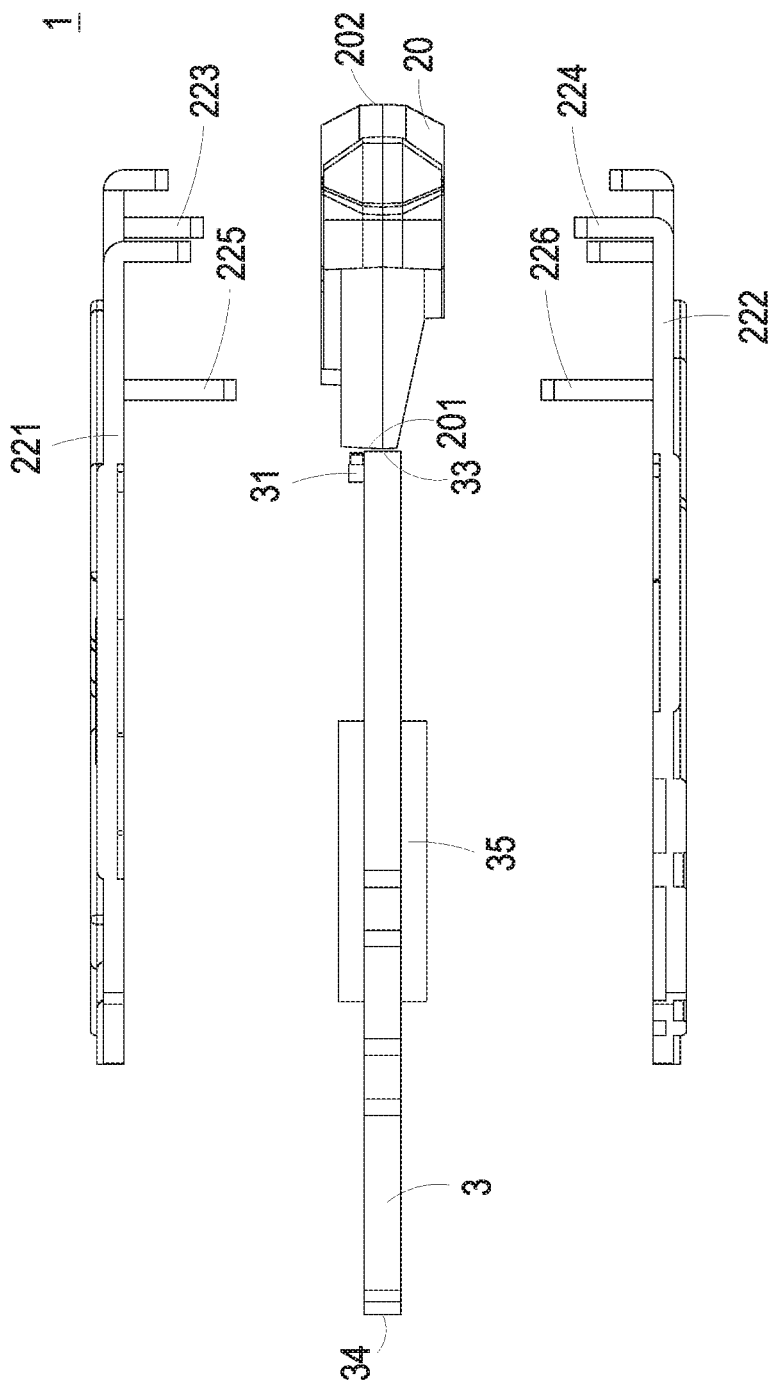
FIG. 5 is a lateral exploded view illustrating an expansion card with a homogenized light output according to an embodiment of the present invention.
Figure 6:
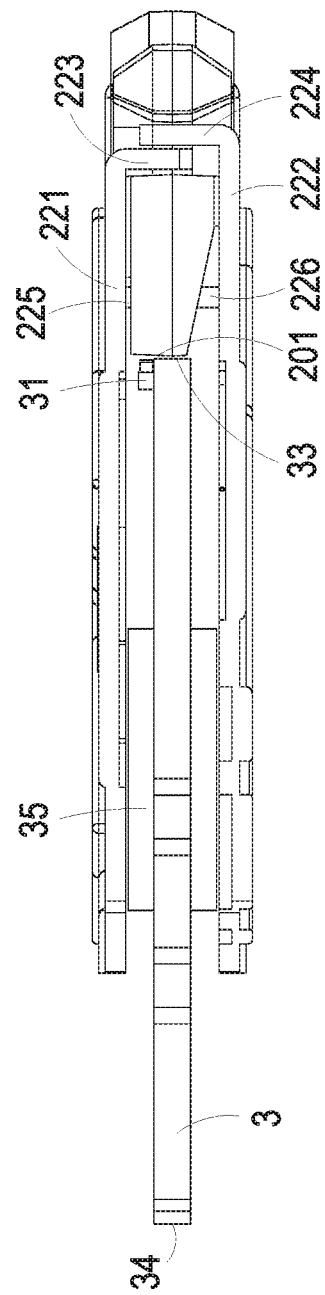
FIG. 6 is a lateral view illustrating an expansion card with a homogenized light output according to an embodiment of the present invention.

FIG. 5 is a lateral exploded view illustrating an expansion card with a homogenized light output according to an embodiment of the present invention. FIG. 6 is a lateral view illustrating an expansion card with a homogenized light output according to an embodiment of the present invention. Please refer to FIGS. 1 to 6. In the embodiment, the clamping set 22 includes a first sheet plate 221, a second sheet plate 222, at least one first engaging element 223 and at least one second engaging element 224. The at least one first engaging element 223 and the at least one second engaging element 224 are disposed on the first sheet plate 221 and the second sheet plate 222 respectively. The first engaging element 223 of the first sheet plate 221 and the second engaging element 224 of the second sheet plate 222 are connected with each other. Consequently, the first sheet plate 221 and the second sheet plate 222 clamp the two opposite surfaces of the circuit board 3, sandwich the light-guiding body 20 to be fixed near the first side edge 33 of the circuit board 3, and partially cover the circuit board 3 and the light-guiding body 20, so as to expose the at least one light-output side 202 of the light-guiding body 20. In one embodiment, the relevant connection between the first engaging element 223 of the first sheet plate 221 and the second engaging element 224 of the second sheet plate 222 includes but not limited to the buckle-type connection or the hook-type connection. The numbers and dispositions of the first engaging element 223 and the second engaging element 224 aren't limited to the above embodiment and can be adjusted according to the practical requirements. In some embodiments, the first sheet plate 221 and the second sheet plate 222 of the clamping set 22 are made by a thermal conductive material, for example but not limited to a metallic material. The light-guiding body 20 is fixed firmly by the clamping set 22 and adjacent to the circuit board 3, and the first sheet plate 221 and the second sheet plate 222 are capable of assisting in heat-dissipation and protection of the electronic device 35 and the light-emitting device 31. Consequently, the damage of the electronic device 35 or the light-emitting device 31 by the aggregated heat can be avoided. In one embodiment, the first sheet plate 221 further includes at least one first auxiliary engaging element 225 disposed thereon. The second sheet plate 222 further includes at least one second auxiliary engaging element 226 disposed thereon. The first auxiliary engaging element 225 and the second auxiliary engaging element 226 are oppositely disposed and detachably connected with each other. The light-guiding body 20 further includes at least one engaging hole 28 passing through two opposite lateral sides thereof and corresponding to the first auxiliary engaging element 225 and the second auxiliary engaging element 226. The first auxiliary engaging element 225 of the first sheet plate 221 and the second auxiliary engaging element 226 of the second sheet plate 222 correspondingly pass through the at least one engaging hole 28 to connect with each other. Consequently, the light-guiding body 20 is sandwiched firmly by the clamping set 22 and fixed adjacently to the circuit board 3.

In accordance with an aspect of the present invention, the light beam L1 emitted from the light-emitting device 31 of the circuit board 3 passes through the light-diffusion element 24 firstly. The light beam L1 is transmitted into the light-guiding body 20 from the light-input side 201, and scattered by the light-diffusion element 24. Thereafter, the directions or the transmitting path of portion of the light beams is adjusted by utilizing the light-turning element 26 according to the principle of refraction and offset. Consequently, plural light beams are distributed to output from different light-output sides to accomplish the homogenized light output, the visual overstimulation won't be induced by directly emitting the light beams to a user's eyes, and the uneven brightness won't be caused by the configured location of the light-emitting devices 31.

In the embodiment, the light-guiding body 20 of the light-homogenizing device 2 is made by a transparent material. Optionally, the length, the thickness and the width of the light-guiding body 20 of the light-homogenizing device 2 are arranged respectively from 125 mm to 135 mm, from 3 mm to 6 mm, and from 35 mm to 50 mm. In some embodiment, the light-turning element 26 is a slit aperture passing through two opposite lateral sides of the light-guiding body 20. Optionally, the length, the width and the height of the light-turning element 26 are arranged respectively from 3 mm to 7 mm, from 0.3 mm to 0.7 mm, and from 4 mm to 6 mm. It is noted that the sizes of the light-homogenizing device 2 and the light-turning aren't limited to the above embodiment and can be adjusted according to the practical requirements.

In summary, the present invention provides an expansion card with a homogenized light output and a light-homogenizing device thereof. The light-homogenizing device is compact, detachable and can be disposed on a circuit board of an expansion card firmly to homogenize the light beams from the light-emitting device on the circuit board and enhance the illumination efficiency. In addition, the light-homogenizing device can protect the electronic device and the light-emitting device disposed on the circuit board, and further assist in dissipating heats from the electronic device and the light-emitting device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An expansion card with a homogenized light output comprising:
    a circuit board having at least one light-emitting device disposed on a first side edge thereof; and
    a light-homogenizing device, comprising:

a light-guiding body having a light-input side and at least one light-output side, wherein the light-input side and the light-output side are disposed on two opposite sides of the light-guiding body respectively, and the light-input side is adjacent to the first side edge of the circuit board;

at least two light-diffusion elements disposed on the light-input side of the light-guiding body and opposite to the light-emitting device of the circuit board, wherein the light-diffusion elements and the light-output side are configured to form at least one light-transmitting path, and each of the light-diffusion elements comprises an uneven structure having a serrated cutting edge and is configured to diffuse plural light beams entering into the light-guiding body from the light-emitting device, so that the plural light beams are scattered at random angles; and at least one light-turning element disposed as a slit aperture in the light-guiding body, located on the light-transmitting path between the at least two light diffusion elements, passing through two opposite lateral sides of the light-guiding body and configured to turn the directions of a portion of the light beams between the light-input side and the light-output side.

2. The expansion card with the homogenized light output according to claim 1, wherein the light-homogenizing device comprises a clamping set disposed on two opposite surfaces of the circuit board and sandwiching the light-guiding body fixed near the first side edge of the circuit board so that the light-input side is opposite to the at least one light-emitting device.

3. The expansion card with the homogenized light output according to claim 2, wherein the clamping set comprises:
a first sheet plate;
a second sheet plate;
at least one first engaging element disposed on the first sheet plate; and
at least one second engaging element disposed on the second sheet plate, corresponding to the at least one first engaging element and configured to connect with the corresponding first engaging element, wherein the first sheet plate and the second sheet plate clamp the two opposite surfaces of the circuit board, sandwich the light-guiding body fixed near the first side edge of the circuit board, and partially cover the circuit board and the light-guiding body, so as to expose the at least one light-output side of the light-guiding body.

4. The expansion card with the homogenized light output according to claim 3, wherein the clamping set comprises:
at least one first auxiliary engaging element disposed on the first sheet plate; and
at least one second auxiliary engaging element disposed on the second sheet plate, corresponding to the at least one first auxiliary engaging element and configured to connect with the corresponding first auxiliary engaging element, wherein the light-guiding body comprises at least one engaging hole, and the first auxiliary engaging element of the first sheet plate and the second auxiliary engaging element of the second sheet plate correspondingly pass through the at least one engaging hole to connect with each other.

5. The expansion card with the homogenized light output according to claim 2, wherein the clamping set is made by a metallic material.

6. The expansion card with the homogenized light output according to claim 1, wherein the at least one light-output side of the light-guiding body comprises a first light-output side, a second light-output side and a third light-output side, the at least one light-diffusion element comprises a first light-diffusion element and a second light-diffusion element, the at least one light-turning element comprises a first light-turning element and a second light-turning element, and the at least one light-emitting device comprises a first light-emitting device and a second light-emitting device, wherein the first light-diffusion element and the second light-diffusion element are disposed and opposite to the first light-emitting device and the second light-emitting device respectively.

7. The expansion card with the homogenized light output according to claim 6, wherein the distance between the first light-diffusion element and the first light-output side is shorter than the distance between the first light-diffusion element and the second light-output side, the first light-turning element is located between the first light-diffusion element and the first light-output side, and the distance between the first light-turning element and the first light-output side is shorter than the distance between the first light-turning element and the second light-output side.

8. The expansion card with the homogenized light output according to claim 6, wherein the distance between the second light-diffusion element and the third light-output side is shorter than the distance between the second light-diffusion element and the second light-output side, the second light-turning element is located between the second light-diffusion element and the third light-output side, and the distance between the second light-turning element and the third light-output side is shorter than the distance between the second light-turning element and the second light-output side.

9. The expansion card with the homogenized light output according to claim 1, wherein the light-diffusion element is integrated with the light-guiding body to form one piece and comprises an uneven structure.

10. The expansion card with the homogenized light output according to claim 1, wherein the light-diffusion element is a light-transmitting optical film attached to the light-input side of the light-guiding body and comprises an uneven structure.

11. The expansion card with the homogenized light output according to claim 1, wherein the light-turning element has a first refractive index, the light-guiding body has a second refractive index, and the first refractive index is smaller than the second refractive index.

12. The expansion card with the homogenized light output according to claim 1, wherein the light-guiding body is made by a transparent material.

13. The expansion card with the homogenized light output according to claim 1, wherein the expansion card is a memory device or an interface card.

14. The expansion card with the homogenized light output according to claim 1, wherein the light-emitting device comprises one or a plurality of light-emitting diodes.

15. The expansion card with the homogenized light output according to claim 1, wherein the circuit board comprises an input and output interface disposed on a second side edge of the circuit board, wherein the first side edge and the second side edge are opposite to each other.

16. A light-homogenizing device applied in a circuit board of an expansion card, wherein the circuit board comprises at least one light-emitting device disposed on a first side edge thereof, the light-homogenizing device comprising:

a light-guiding body having a light-input side and at least one light-output side, wherein the light-input side and the light-output side are disposed on two opposite sides of the light-guiding body respectively, and the light-input side is adjacent to the first side edge of the circuit board;

at least two light-diffusion element disposed on the light-input side of the light-guiding body and opposite to the light-emitting device of the circuit board, wherein the light-diffusion elements and the light-output side are configured to form at least a light-transmitting path, and each of the light-diffusion elements comprises an uneven structure having a serrated cutting edge and is configured to diffuse plural light beams entering into the light-guiding body from the light-emitting device, so that the plural light beams are scattered at random angles; and at least one light-turning element disposed as a slit aperture in the light-guiding body, located on the light-transmitting path, between the at least two light diffusion elements passing through two opposite lateral sides of the light-guiding body and configured to turn the directions of a portion of the light beams between the light-input side and the light-output side.

17. The light-homogenizing device according to claim 16, further comprising a clamping set disposed on two opposite surfaces of the circuit board and sandwiching the light-guiding body fixed near the first side edge of the circuit board so that the light-input side being opposite to the at least one light-emitting device.

18. The light-homogenizing device according to claim 17, wherein the clamping set comprises:

a first sheet plate;

a second sheet plate;

at least one first engaging element disposed on the first sheet plate; and at least one second engaging element disposed on the second sheet plate, corresponding to the at least one first engaging element and configured to connect with the corresponding first engaging element, wherein the first sheet plate and the second sheet plate clamp the two opposite surfaces of the circuit board, sandwich the light-guiding body fixed near the first side edge of the circuit board, and partially cover the circuit board and the light-guiding body, so as to expose the at least one light-output side of the light-guiding body.

19. The light-homogenizing device according to claim 16, wherein the light-diffusion element is integrated with the light-guiding body to form one piece and comprises an uneven structure.

20. The light-homogenizing device according to claim 16, wherein the light-diffusion element is a light-transmitting optical film attached to the light-input side of the light-guiding body and comprises an uneven structure.

* * * * *